United States Patent
Hawa

(10) Patent No.: US 8,844,563 B2
(45) Date of Patent: Sep. 30, 2014

(54) DUAL PLATE CHECK VALVE

(75) Inventor: Javed Anwar Hawa, Mumbai (IN)

(73) Assignee: Hawa Valves (India) Private Limited, Navi-Mumbai (IN)

(*) Notice: Subject to any disclaimer, the term of this patent is extended or adjusted under 35 U.S.C. 154(b) by 241 days.

(21) Appl. No.: 13/252,688

(22) Filed: Oct. 4, 2011

(65) Prior Publication Data

US 2013/0019966 A1 Jan. 24, 2013

Related U.S. Application Data

(60) Provisional application No. 61/509,814, filed on Jul. 20, 2011.

(51) Int. Cl.
  *F16K 15/03* (2006.01)
  *F16K 21/04* (2006.01)
  *F16K 1/22* (2006.01)

(52) U.S. Cl.
  CPC . *F16K 1/22* (2013.01); *F16K 15/03* (2013.01); *F16K 15/038* (2013.01)
  USPC ........................................ 137/512.1; 251/286

(58) Field of Classification Search
  USPC ........ 137/511, 512, 512.1; 251/284, 285, 286
  See application file for complete search history.

(56) References Cited

U.S. PATENT DOCUMENTS

| | | | | |
|---|---|---|---|---|
| 4,005,732 A | * | 2/1977 | Buckner | 137/512.1 |
| 4,043,358 A | * | 8/1977 | Sliski | 137/512.1 |
| 4,079,751 A | * | 3/1978 | Partridge et al. | 137/516.29 |
| 5,245,956 A | * | 9/1993 | Martin | 137/512.1 |
| 5,246,032 A | * | 9/1993 | Muddiman | 137/512.1 |
| 5,301,709 A | * | 4/1994 | Gasaway | 137/15.18 |
| 5,318,063 A | * | 6/1994 | Muddiman | 137/454.2 |
| 5,381,821 A | * | 1/1995 | Muddiman | 137/454.2 |
| 5,392,810 A | * | 2/1995 | Cooper et al. | 137/512.1 |
| 5,819,790 A | * | 10/1998 | Cooper | 137/512.1 |
| 6,253,788 B1 | * | 7/2001 | Palvolgyi | 137/512.1 |
| 2008/0053537 A1 | * | 3/2008 | McGonigle et al. | 137/512.1 |

* cited by examiner

*Primary Examiner* — John Rivell
*Assistant Examiner* — Kevin Barss
(74) *Attorney, Agent, or Firm* — Saul Ewing LLP

(57) ABSTRACT

A check valve in which a stop pin assembly is situated so as to prevent the movement of a flapper beyond a predetermined position. In a preferred embodiment the check valve has two flappers with the stop pin assembly situated therebetween to prevent either one of them from pivoting beyond an essentially vertical position. The stop pin assembly is configured such that it can be inserted and locked in place when the check valve is inserted within a valve body that contains the check valve. The stop pin assembly can comprise three elements including a central portion and first and second end portions, although the stop pin assembly could instead comprise a single element. The stop pin assembly is inserted between two holders and in a preferred embodiment is rotatable to a locking position where it is affixed in place by fasteners.

6 Claims, 5 Drawing Sheets

DUAL PLATE CHECK VALVE

CROSS-REFERENCE TO RELATED APPLICATIONS

This application is based on, and claims priority to, U.S. Provisional Application No. 61/509,814, filed Jul. 20, 2011, the entire contents of which are fully incorporated herein by reference.

BACKGROUND OF THE INVENTION

1. Field of the Invention

This invention relates to field of check valves and, more particularly, to a dual plate check valve incorporating a stop pin assembly, with the stop pin assembly preventing valve flappers from pivoting beyond a predetermined position.

2. Description of the Related Art

Check valves are one-way valves that permit a fluid to flow in one direction but not in the other direction. They come in a variety of sizes, shapes, and types and are usually self-controlling, meaning that the flow of the fluid itself will typically control the opening and closing of the check valve. They are often used in systems that utilize pumps to pump the fluid through piping or other similar vessels; a heart valve (natural or man-made) is one example of a check valve.

A certain type of check valve, sometimes referred to as a swing check valve or tilting disc check valve, utilizes one or more movable discs, sometimes referred to as "flappers", to block the reverse flow of fluids. In a typical arrangement, the flapper is hinged on an axis of some kind, such as a hinge pin. In a two-flapper (dual-plate) arrangement, the hinge pin is centrally located with each flapper pivoting on the hinge pin towards each other like the wings of a butterfly.

SUMMARY OF THE INVENTION

The claimed invention provides a novel structure for a check valve in which a stop pin is situated between two flappers to prevent either one of them from pivoting beyond an essentially vertical position, as described and shown in more detail in connection with the drawings provided herewith. In a preferred embodiment, the stop pin is configured such that it can be inserted and locked in place when the check valve is inserted within a valve body that contains the check valve. In a more preferred embodiment the stop pin comprises three elements comprising a central portion and first and second end portions, although it is contemplated that the stop pin could instead comprise a single element in which the first and second end portions are integrated with the central portion. The stop pin is inserted between two holders and in a preferred embodiment is rotatable to a locking position where it is affixed in place by fasteners.

DETAILED DESCRIPTION OF THE PREFERRED EMBODIMENTS

Figure 1:
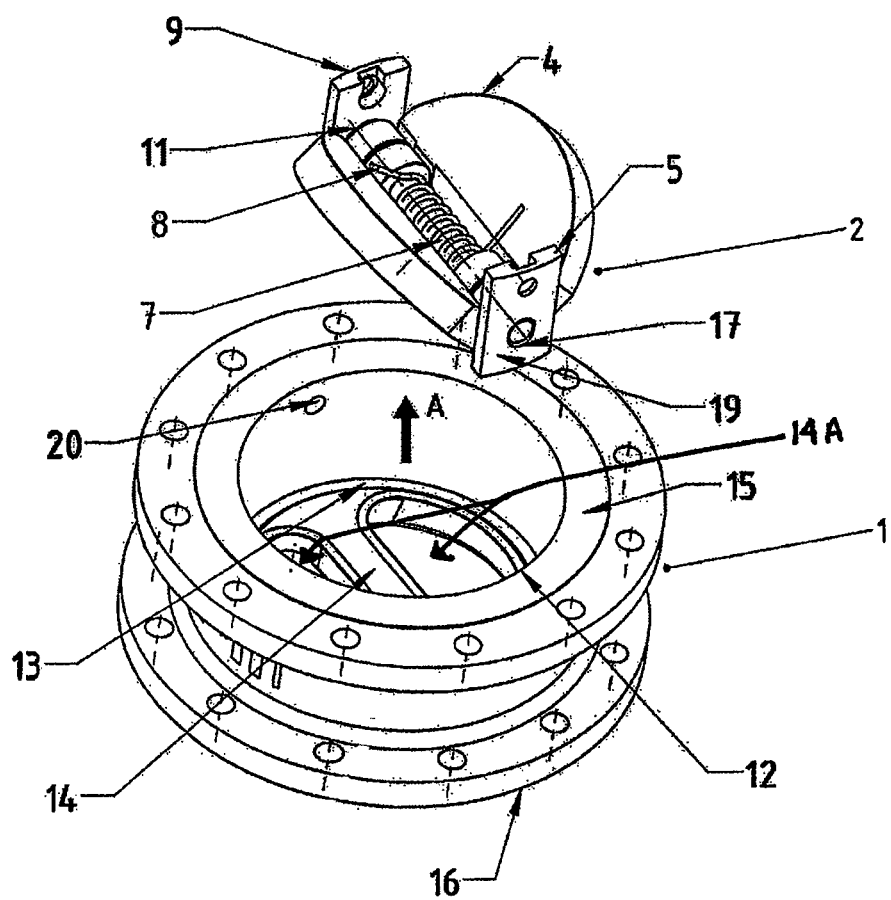
FIG. 1 is an exploded view of a check valve in accordance with the claimed invention comprising a valve body and a disc (flapper) assembly.

FIGS. 1 to 5 illustrate a preferred embodiment of the claimed invention. FIG. 1 is an exploded view of a check valve comprising a valve body 1 and a disc (flapper) assembly 2. The stop pin assembly of the claimed invention is not shown in FIG. 1 for sake of simplicity, but is described in detail below. The valve body 1 has a valve body bore 12 in which is positioned a seat 13. The seat 13 provides a base against which disc assembly 2 is placed when inserted within valve body bore 12 during use. A web 14 extends diametrically across the valve body bore 12 and divides the seat 13 into two halves, each half comprising a flow opening 14A corresponding to each of the flappers 4, discussed below. Gasket surfaces 15 and 16 respectively are at each end of the valve body and provide mounting surfaces for gaskets in a known manner. When the check valve of FIG. 1 is inserted in a pipe, fluid flow would normally be in the upward direction relative to FIG. 1, as indicated by arrow A.

Figure 2:
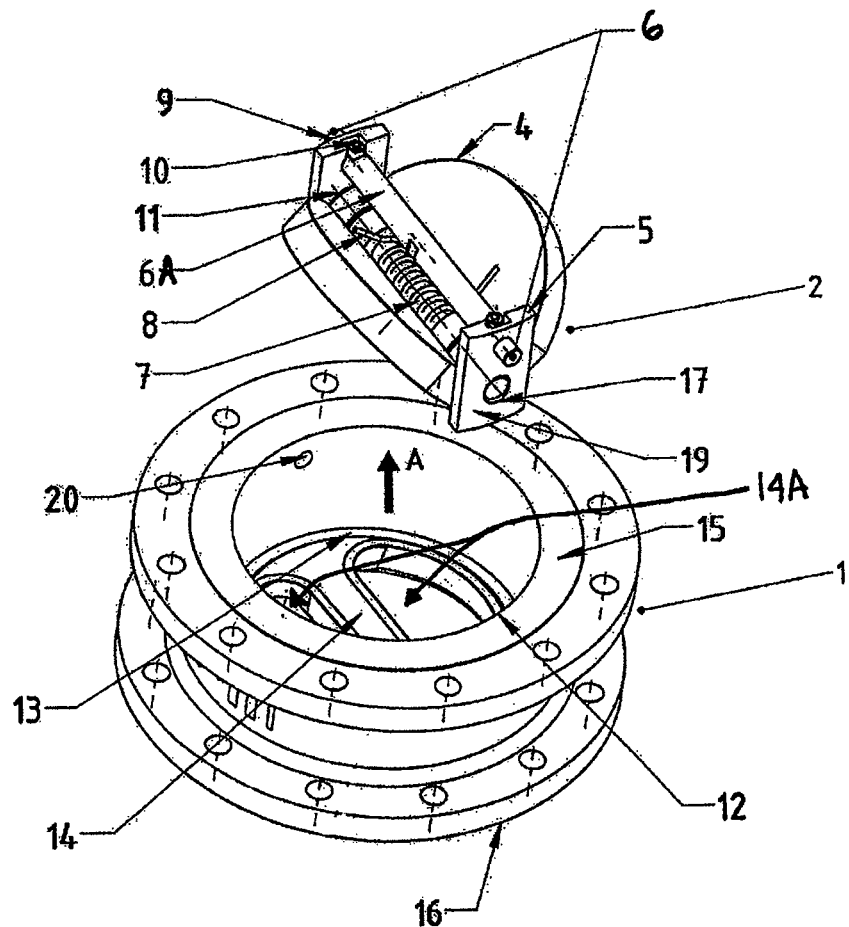
FIGS. 2-5 show a check valve according to the claimed invention and components thereof in varying degrees of detail.
Figure 3:
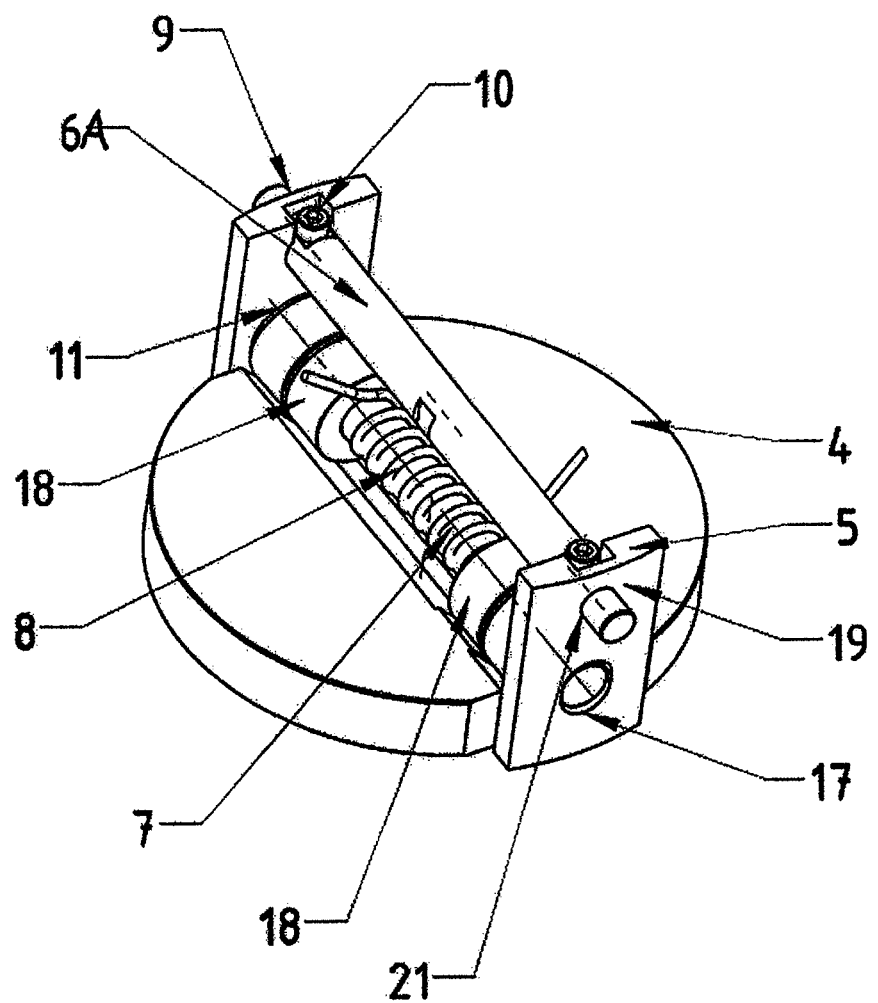

The disc assembly 2 is shown in more detail in FIGS. 2 and 3. In this embodiment the assembly comprises two substantially semi-circular flappers 4 (first and second flappers), two holders 5 (first and second holders), and a hinge pin 7 (axle pin). In each holder 5 is an elongated (essentially oval-shaped) bore 17, with a longitudinal axis 11 of elongated bore 17 being substantially parallel to a longitudinal axis of the valve body 1 corresponding to the direction of travel of fluid flowing within the check valve. Each end of the hinge pin 7 is mounted in one of the elongated slots and the flappers 4 are mounted on the hinge pin 7. In this configuration, the flappers 4 can pivot on hinge pin 7, for example, from shown in FIG. 2 to the position shown in FIG. 3.

In this embodiment the flappers 4 are mounted on the hinge pin 7 using bosses 18, as can be best seen in FIG. 3. An outer surface 19 of each of the holders 5 is of the same profile as that of the inner surface of the valve body bore 12, so that they will fit snugly against the inner surface. In this preferred embodiment the valve body bore 12 is essentially circular in shape and the outer surface 19 of the holders 5 are curved so as to correspond to the essentially circular shape of the valve body bore 12.

The disc assembly 2 is positioned in the bore 12 by holding the disc assembly 2 with the flappers 4 urged towards the open position, as shown in FIG. 1, and inserting the disc assembly 2 into the valve body bore 12, until it is stopped by seat 13.

By design, the dual plate configuration shown in FIGS. 1-5 contemplates that each flapper 4 is essentially responsible for blocking or allowing flow through one half of the valve body bore diameter, i.e., each disc is associated with one half of the valve body bore 12 and with one of the flow openings 14A. As shown in FIG. 1, each of the flappers 4 could theoretically be urged far enough towards the open position such that one of them could move past the vertical position, i.e., one of the flappers 4 could be moved into a position whereby it impinges on the half of the valve body bore diameter associated with the other flapper 4. To ensure that the flappers 4 do not move such that one of the flappers 4 moves past the vertical position, a stop pin assembly 6 is provided. As seen in FIGS. 2-5, the stop pin assembly 6 is mounted in bores 21 in the holder 5.

Figure 4:
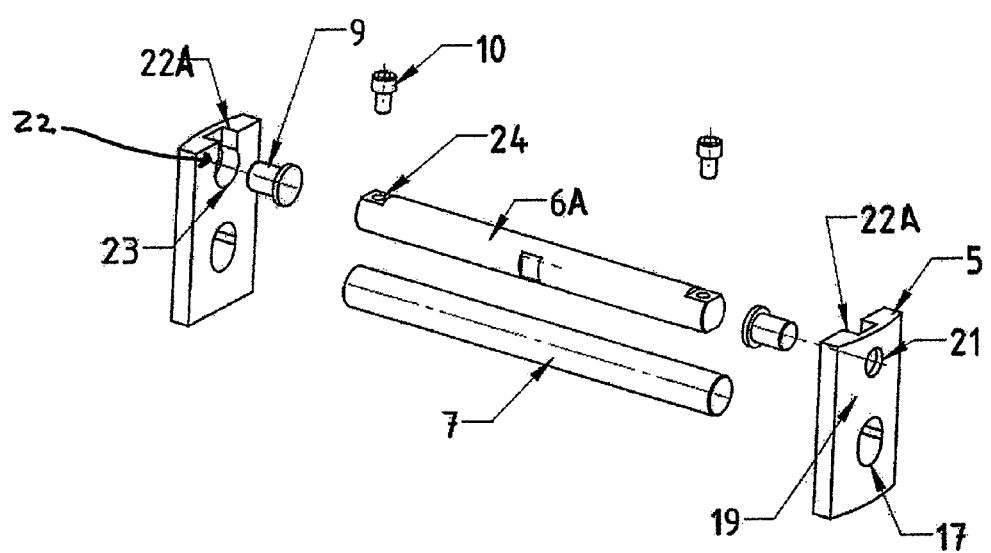

FIG. 4 shows details of a preferred embodiment of a subassembly comprising the hinge pin 7, stop pin assembly 6, and holders 5 of the claimed invention, with the flappers 4 and associated elements (bosses 18, spring 8) removed for sake of simple explanation. As noted above, in each holder 5 is an elongated bore 17. The elongated bores 17 permit upward and downward movement of the hinge pin 7 within the elongated bore 17, along the axis of the check valve, to permit the back edges or "heels" of the flappers 4 to clear the seat 13 as they rotate to the open position and also back to the closed position.

The stop pin assembly 6 is designed so that it can be inserted into the holders 5, and locked into place, while the disc assembly is sitting inside the valve body 1. In a preferred embodiment illustrated in FIG. 4, the stop pin assembly 6 comprises a three-piece assembly comprising stop pin 6A (center element or central pin portion) and two retainer pins 9 (first and second end elements). A retainer pin bore 21 is formed through the outer surface of each holder 5 as shown. The inside diameter of retainer pin bore 21 is sized so that that a shaft portion of retainer pins 9 can slide snugly therethrough. In the inner surface of each holder 5, a slot 22 is formed, having a flat-sided top portion 22A and a generally circular bottom portion 23 as shown. In this embodiment, the diameter of the circular bottom portion 23 is slightly larger than the diameter of retainer pin bore 21, so that a head portion of retainer pins 9 will prevent the retainer pins 9 from sliding through the retainer pin bore 21 when the shaft portion of a retainer pin 9 is inserted through a retainer pin bore 21 in the holder as shown in the drawing figures. The stop pin 6A can have first and second ends with the first retainer pin being positionable adjacent to said first end and said second retainer pin being positionable adjacent to said second end.

To enable the locking of the stop pin assembly 6 in place in the holders 5, each end of stop pin 6 has flat sides formed as shown, corresponding to the flat sided top portion 22A of retainer pins 9. In this configuration, when oriented properly, the stop pin 6 can slide through the flat sided top portion 22A and into the circular bottom portion 23. Through each flat side of stop pin 6 is formed a hole or other means cooperating with a fastener 10 to enable the rotational movement of the stop pin 6 around its longitudinal axis to be prevented/inhibited. In the preferred embodiment shown in the figures, the hole in each flat side of stop pin 6 is a threaded hole that has threading matching threading on fastener 10, which enables a fastener 10 to be threaded into each hole. A head portion of fastener 10 should be sized such that it fits within the flat-sided top portion 22A as shown, thereby securing the stop pin assembly in place and preventing it from moving rotationally about its longitudinal axis. In a preferred embodiment, fastener 10 comprises an allen screw, i.e., a screw having a hexagonal hole in its head for use with a hex or alien wrench. However, it is understood that numerous other fastening means may be utilized to enable the fixing of the stop pin assembly 6 in place as shown and described, and such alternative fastening means are within the scope of the claimed invention.

To assemble the full disc assembly 2 into the valve body, the hinge pin 7, with the flappers 4 and spring 8 situated thereon, is inserted into the elongated bores 17 of holders 5, and then as a group are inserted into the bore to rest on the seat. The retainer pins 9 are then inserted into bores 20 of the valve body (only one is visible in the drawing but in a preferred embodiment there is a second one situated 180° from the one shown, to accommodate the second retainer pin 9) through the bores 21 of the holders 5 until flushed into it. Then, as described below, the stop pin 6A is fastened in to complete the disc assembly 2.

Figure 5:
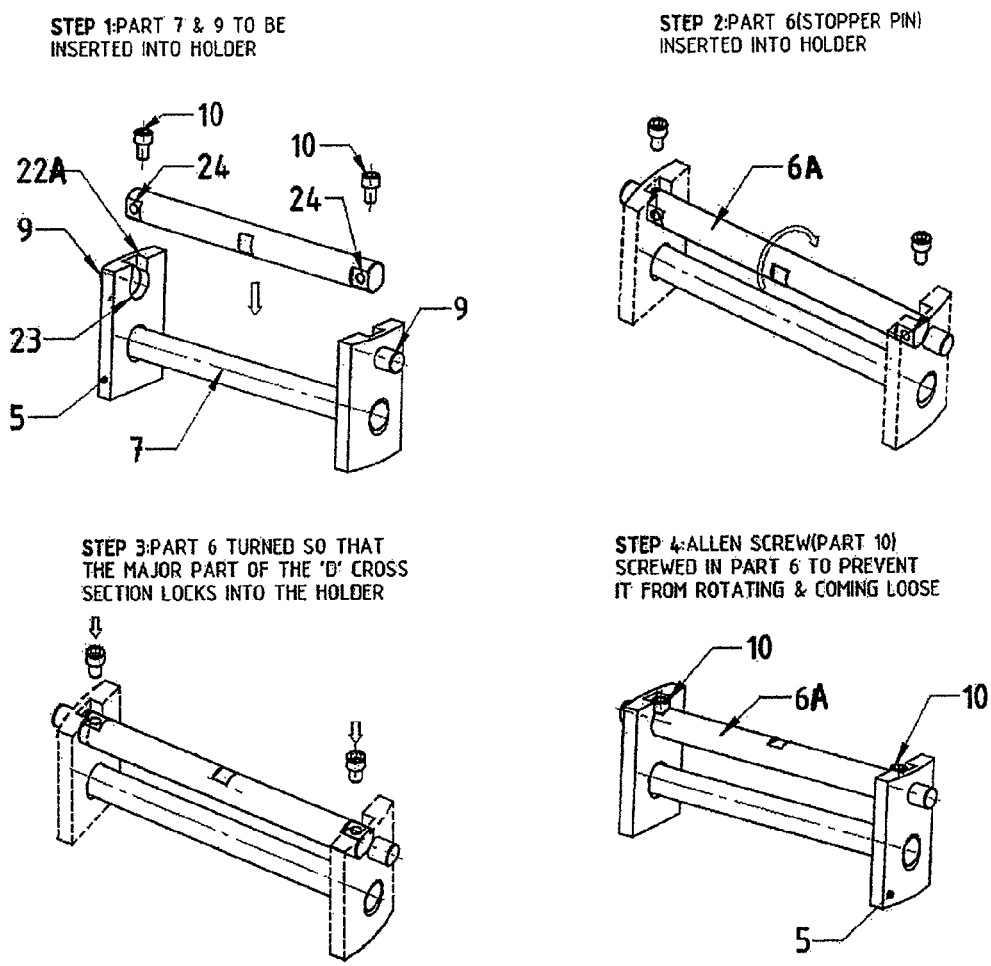

A step by step procedure of locking the stop pin 6A into the holders 5 is illustrated in FIG. 5. Stop pin 6A is inserted through the slots 22 of the holders 5 in a way that its flat ends slide through the slots 22 and come to rest in circular bottom portion 23 of holders 5. Next, stop pin 6A is rotated 90° to allow the fasteners 10 to be screwed into holes 24 through the slots 22, locking the stop pin 6A in position. Although not required, a portion of the stop pin 6A away from its ends can be formed with flat sides (see center of stop pin 6A in the drawing figures) so that a wrench or other device can be secured thereon and torqued to rotate the stop pin 6A as described).

As noted above, the elongate bores 17 permit movement of the stop pin 6A, along the axis of the valve, to permit the back edges or "heels" of the flappers 4 to clear the seat as they rotate to the open position and also back to the closed position. In the event that these bores become worn to an extent that replacement is necessary only the holders 5 need be replaced, rather than the entire valve.

In general, dual plate check values are made in various grades of ferrous (such as various grades of Carbon and Stainless Steels) and non-ferrous metals, copper alloys, nickel alloys and other such metals depending on the metal compatible/suitable for the various materials (flow media) which flows within the dual plate check valves. Thus, the preferred material to be used depends on compatibility of the flow media. In a preferred embodiment, the internal parts are made of various grades of stainless steels.

Further, non-metals, such as polymers and such advanced engineered and engineering plastics, and ceramics can also be used.

Although the present invention has been described with respect to a specific preferred embodiment thereof, various changes and modifications may be suggested to one skilled in the art and it is intended that the present invention encompass such changes and modifications as fall within the scope of the appended claims. For example, although the stop pin assembly is described and shown as a three piece element, it is contemplated that it could also comprise a single element with the stop pin 6A and the two retainer pins 9 being formed integrally such that they are a single piece. Further, although the valve body bore in which the disc assembly 2 is inserted is shown as being essentially circular (pipe-shaped) in shape, it is understood that the valve body bore could be essentially any shape, in which case the components of the disc assembly 2 would merely need to be modified in shape to correspond to the shape of the valve body bore. In addition, although the preferred embodiment described herein uses two bores 20 corresponding to two retainer pins 9, it is understood that the device could instead be designed with a single bore 20 and a single corresponding retainer pin 9 and still provide the benefits and functionality described herein.

I claim:

1. A disk assembly for a check valve, comprising:
    an axle pin coupled between first and second holders;
    first and second flappers pivotally coupled to said axle pin; and
    a stop pin assembly coupled between said first and second holders, said stop pin assembly including:
        a stop pin having a center element and a first end element, said first end element including a pin portion extending through said first holder; and
        said stop pin being lockable in place between said first and second holders,
    wherein the center element has two end section with flat sides; and
        the first and second holders each have a slot with a flat-sided top portion and a generally circular bottom portion, such that when oriented properly, the flat sides of the center element can slide through the flat-sided top portions of the slots and into the circular bottom portions.

2. The disk assembly of claim 1, wherein said stop pin further includes:
    a second end element, said second end element including a shaft portion extending through said second holder.

3. The disk assembly of claim 1, wherein said stop pin further includes:
   a second end element, said second end element including a shaft portion extending through said second holder.

4. The disk assembly of claim 3, wherein said first end element, said center element, and said second end element comprise three distinct, cooperating elements.

5. The disk assembly of claim 3, wherein said first end element, said center element, and said second end element comprise a single unitary piece.

6. A dual plate check valve, comprising:
   a disk assembly, comprising:
      an axle pin coupled between first and second holders;
      a first flapper pivotally coupled to said axle pin;
      a second flapper pivotally coupled to said axle pin; and
      a stop pin assembly coupled between said first and second holders, said stop pin assembly including:
         a stop pin having a center element, a first end element, and a second end element, said first end element including a pin portion extending through said first holder and said second end element including a pin portion extending through said second holder; wherein
      said stop pin is lockable in place between said first and second holders and prevents each of said first flapper and said second flapper from pivoting beyond a pre-determined position
   wherein the center element has two end sections with flat sides; and
   the first and second holders each have a slot with a flat-sided top portion and a generally circular bottom portion, such that when oriented property, the flat sides of the center element can slide through the flat-sided top portions of the slots and into the circular bottom portions.

* * * * *